US011538257B2

(12) United States Patent
Rozploch et al.

(10) Patent No.: US 11,538,257 B2
(45) Date of Patent: Dec. 27, 2022

(54) DETECTION, COUNTING AND IDENTIFICATION OF OCCUPANTS IN VEHICLES

(71) Applicant: Gatekeeper, Inc., Sterling, VA (US)

(72) Inventors: Robert Rozploch, Newtown, PA (US); Simon Shi, Sterling, VA (US); Marc Hansen, Hamilton, NJ (US); Jonathan Nazemi, Doylestown, PA (US)

(73) Assignee: Gatekeeper Inc., Sterling, VA (US)

( * ) Notice: Subject to any disclaimer, the term of this patent is extended or adjusted under 35 U.S.C. 154(b) by 0 days.

(21) Appl. No.: 16/154,130

(22) Filed: Oct. 8, 2018

(65) Prior Publication Data

US 2019/0180125 A1 Jun. 13, 2019

Related U.S. Application Data

(60) Provisional application No. 62/596,497, filed on Dec. 8, 2017.

(51) Int. Cl.
*G06V 20/59* (2022.01)
*G06V 20/54* (2022.01)
(Continued)

(52) U.S. Cl.
CPC ......... *G06V 20/593* (2022.01); *G06K 9/6201* (2013.01); *G06V 20/54* (2022.01);
(Continued)

(58) Field of Classification Search
CPC ........... G06K 9/00228; G06K 9/00288; G06K 9/00248; G06K 9/00838; G06K 2209/15;
(Continued)

(56) References Cited

U.S. PATENT DOCUMENTS 4,288,819 A 9/1981 Williams
5,091,924 A 2/1992 Bermbach
(Continued)

FOREIGN PATENT DOCUMENTS

CA 3010922 A1 9/2017
CN 102682295 9/2012
(Continued)

OTHER PUBLICATIONS

F. Z. Chelali, A. Djeradi and R. Djeradi, "Linear discriminant analysis for face recognition," 2009 International Conference on Multimedia Computing and Systems, Ouarzazate, 2009, pp. 1-10, doi: 10.1109/MMCS.2009.5256630.*
(Continued)

*Primary Examiner* — Tung T Vo
(74) *Attorney, Agent, or Firm* — Novel IP

(57) ABSTRACT

A method of detecting occupants in a vehicle includes detecting an oncoming vehicle and acquiring a plurality of images of occupants in the vehicle in response to detection of the vehicle. The method includes performing automated facial detection on the plurality of images and adding a facial image for each face detected to a gallery of facial images for the occupants of the vehicle. The method includes performing automated facial recognition on the gallery of facial images to group the facial images into groups based on which occupant is in the respective facial images, and counting the final group of unique facial images to determine how many occupants are in the vehicle.

26 Claims, 3 Drawing Sheets

(51) Int. Cl.
*G06K 9/62* (2022.01)
*H04N 5/235* (2006.01)
*H04N 5/247* (2006.01)
*G06V 40/50* (2022.01)
*G06V 40/16* (2022.01)

(52) U.S. Cl.
CPC .......... *G06V 40/161* (2022.01); *G06V 40/166* (2022.01); *G06V 40/172* (2022.01); *G06V 40/50* (2022.01); *H04N 5/2354* (2013.01); *H04N 5/247* (2013.01); *G06V 2201/08* (2022.01)

(58) Field of Classification Search
CPC ........... G06K 9/00785; G06K 9/00255; G06K 9/6201; G06K 9/00926; G06K 2209/23; G07C 9/00079; H04N 5/2354; H04N 5/247; H04N 5/232; G06V 20/593; G06V 20/54; G06V 40/161; G06V 40/166; G06V 40/172; G06V 40/50; G06V 2201/08
USPC ........................................................ 348/159
See application file for complete search history.

(56) References Cited

U.S. PATENT DOCUMENTS

| | | |
|---|---|---|
| 5,119,236 A | 6/1992 | Fong |
| 5,283,643 A | 2/1994 | Fujimoto |
| 5,343,390 A | 8/1994 | Doi |
| 5,361,840 A | 11/1994 | Matthews |
| 5,449,864 A | 9/1995 | Beatty |
| 6,313,946 B1 | 11/2001 | Petitto |
| 6,400,835 B1 | 6/2002 | Lemelson |
| 6,459,764 B1 | 10/2002 | Chalmers |
| 6,611,200 B2 | 8/2003 | Pressnall |
| 6,650,765 B1 | 11/2003 | Alves |
| 6,718,049 B2 * | 4/2004 | Pavlidis ............. G06K 9/00228 348/164 |
| 6,856,344 B2 | 2/2005 | Frantz |
| 6,958,676 B1 | 10/2005 | Morgan |
| 6,972,693 B2 | 12/2005 | Brown |
| 7,076,088 B2 * | 7/2006 | Pavlidis ............. G06K 9/00228 348/164 |
| 7,092,106 B2 | 8/2006 | Cox |
| 7,102,665 B1 | 9/2006 | Chandler |
| 7,132,653 B2 | 11/2006 | Faubion |
| 7,305,108 B2 | 12/2007 | Waehner |
| 7,349,007 B2 | 3/2008 | Millar |
| 7,439,847 B2 | 10/2008 | Pederson |
| 7,469,060 B2 * | 12/2008 | Bazakos ............ G06K 9/00255 382/173 |
| 7,602,942 B2 * | 10/2009 | Bazakos ............ G06K 9/00255 209/577 |
| 7,602,947 B1 | 10/2009 | Lemelson |
| 7,642,899 B2 | 1/2010 | Alvarado |
| 7,689,033 B2 * | 3/2010 | Xiao .................. G06K 9/4614 382/159 |
| 7,786,897 B2 | 8/2010 | Alves |
| 7,792,970 B2 | 9/2010 | Bigioi |
| 8,005,267 B2 | 8/2011 | Chew |
| 8,028,903 B1 | 10/2011 | Daniel |
| 8,054,182 B2 | 11/2011 | Cutchis |
| 8,067,719 B2 | 11/2011 | Herrera |
| 8,155,384 B2 | 4/2012 | Chew |
| 8,254,647 B1 | 8/2012 | Nechyba |
| 8,305,442 B2 | 11/2012 | Millar |
| 8,358,343 B2 | 1/2013 | Millar |
| 8,509,486 B2 | 8/2013 | Hsieh |
| 8,604,901 B2 | 12/2013 | Hoyos |
| 8,830,322 B2 | 9/2014 | Nerayoff |
| 8,861,802 B2 | 10/2014 | Bedros |
| 9,087,204 B2 | 7/2015 | Gormley |
| 9,105,128 B2 | 8/2015 | Robinson |
| 9,189,680 B2 | 11/2015 | Komatsu |
| 9,230,183 B2 | 1/2016 | Bechtel |
| 9,256,794 B2 | 2/2016 | Braithwaite |
| 9,292,754 B2 | 3/2016 | Shin |
| 9,396,595 B1 | 7/2016 | Daniel |
| 9,460,598 B2 | 10/2016 | Noone |
| 9,471,838 B2 | 10/2016 | Miller |
| 9,533,687 B2 | 1/2017 | Lisseman |
| 9,552,524 B2 | 1/2017 | Artan |
| 9,600,712 B2 | 3/2017 | Jin |
| 9,613,258 B2 | 4/2017 | Chen |
| 9,623,878 B2 | 4/2017 | Tan |
| 9,667,627 B2 | 5/2017 | Gormley |
| 9,791,766 B2 | 10/2017 | Ekin |
| 9,953,149 B2 | 4/2018 | Tussy |
| 9,953,210 B1 | 4/2018 | Rozploch |
| 10,146,797 B2 | 12/2018 | Bataller |
| 10,262,126 B2 | 4/2019 | Tussy |
| 10,657,360 B2 | 5/2020 | Rozploch |
| 10,674,587 B2 | 6/2020 | Sinitsyn |
| 10,839,200 B2 | 11/2020 | Nazemi |
| 10,867,193 B1 | 12/2020 | Hansen |
| 11,087,119 B2 | 8/2021 | Nazemi |
| 11,196,965 B2 | 12/2021 | Hansen |
| 2002/0092988 A1 | 7/2002 | Didomenico |
| 2003/0174865 A1 | 9/2003 | Vernon |
| 2003/0185340 A1 | 10/2003 | Frantz |
| 2003/0209893 A1 | 11/2003 | Breed |
| 2004/0070679 A1 | 4/2004 | Pope |
| 2004/0165750 A1 | 8/2004 | Chew |
| 2004/0199785 A1 | 10/2004 | Pederson |
| 2004/0225651 A1 | 11/2004 | Musgrove |
| 2005/0063566 A1 | 3/2005 | Beek |
| 2005/0105806 A1 | 5/2005 | Nagaoka |
| 2005/0110610 A1 * | 5/2005 | Bazakos ............ G06K 9/00228 340/5.82 |
| 2005/0271184 A1 | 12/2005 | Ovadia |
| 2006/0018522 A1 | 1/2006 | Sunzeri |
| 2006/0028556 A1 * | 2/2006 | Bunn ..................... G10L 15/25 348/211.99 |
| 2006/0055512 A1 | 3/2006 | Chew |
| 2006/0102843 A1 * | 5/2006 | Bazakos ............ G06K 9/00255 250/339.05 |
| 2006/0117186 A1 | 6/2006 | Yeo |
| 2006/0146062 A1 | 7/2006 | Kee |
| 2006/0284982 A1 | 12/2006 | Bigioi |
| 2007/0030350 A1 | 2/2007 | Wagner |
| 2007/0087756 A1 * | 4/2007 | Hoffberg ............ G06Q 10/0631 455/450 |
| 2007/0112699 A1 * | 5/2007 | Zhao .................. G06K 9/00281 706/14 |
| 2007/0122007 A1 * | 5/2007 | Austin ............... G06K 9/00221 382/118 |
| 2007/0133844 A1 | 6/2007 | Waehner |
| 2008/0175438 A1 * | 7/2008 | Alves .................. G08G 1/0175 382/105 |
| 2008/0211914 A1 | 9/2008 | Herrera |
| 2008/0285803 A1 | 11/2008 | Madsen |
| 2008/0297611 A1 | 12/2008 | Qiu |
| 2008/0298644 A1 * | 12/2008 | Irmatov ............. G06K 9/00221 382/118 |
| 2009/0023472 A1 | 1/2009 | Yoo |
| 2009/0080715 A1 | 3/2009 | Van Beek |
| 2009/0232365 A1 * | 9/2009 | Berthilsson ........ G06K 9/00281 382/118 |
| 2009/0303342 A1 | 12/2009 | Corcoran |
| 2010/0158380 A1 * | 6/2010 | Neville ............. G06K 9/00221 382/190 |
| 2011/0182473 A1 | 7/2011 | Wang |
| 2011/0242285 A1 | 10/2011 | Byren |
| 2012/0069183 A1 | 3/2012 | Aoki |
| 2012/0106806 A1 * | 5/2012 | Folta .................. G06K 9/00295 382/118 |
| 2012/0140079 A1 | 6/2012 | Millar |
| 2012/0262577 A1 * | 10/2012 | Wang .................... G06T 7/11 348/148 |

(56) References Cited

U.S. PATENT DOCUMENTS

| | | | |
|---|---|---|---|
| 2012/0328197 A1* | 12/2012 | Sanderson | G06K 9/00288 382/191 |
| 2013/0129159 A1 | 5/2013 | Huijgens | |
| 2013/0147959 A1* | 6/2013 | Wang | G06K 9/00838 348/149 |
| 2013/0176285 A1 | 7/2013 | Sato | |
| 2013/0202274 A1 | 8/2013 | Chan | |
| 2013/0236068 A1 | 9/2013 | Eshghi et al. | |
| 2013/0243260 A1 | 9/2013 | Burry | |
| 2013/0251214 A1 | 9/2013 | Chung | |
| 2013/0266193 A1 | 10/2013 | Tiwari | |
| 2013/0266196 A1 | 10/2013 | Kono | |
| 2013/0279757 A1* | 10/2013 | Kephart | G06Q 50/265 382/105 |
| 2013/0336538 A1* | 12/2013 | Skaff | G06K 9/00785 382/104 |
| 2014/0002617 A1 | 1/2014 | Zhang | |
| 2014/0029005 A1 | 1/2014 | Fiess | |
| 2014/0044348 A1 | 2/2014 | Chen | |
| 2014/0063177 A1 | 3/2014 | Tian | |
| 2014/0132501 A1 | 5/2014 | Choi | |
| 2014/0132746 A1 | 5/2014 | King | |
| 2014/0253701 A1 | 9/2014 | Wexler | |
| 2014/0254890 A1 | 9/2014 | Bergman | |
| 2014/0285315 A1 | 9/2014 | Wiewiora | |
| 2014/0320281 A1 | 10/2014 | Sager | |
| 2014/0334684 A1* | 11/2014 | Strimling | G06K 9/3258 382/105 |
| 2015/0131872 A1 | 5/2015 | Ganong | |
| 2015/0186711 A1 | 7/2015 | Baldwin | |
| 2015/0261994 A1 | 9/2015 | Yamaji | |
| 2015/0262024 A1 | 9/2015 | Braithwaite | |
| 2015/0278617 A1* | 10/2015 | Oami | G06T 1/60 382/103 |
| 2015/0286883 A1 | 10/2015 | Xu | |
| 2015/0294144 A1* | 10/2015 | Konishi | H04N 7/188 382/103 |
| 2015/0317535 A1 | 11/2015 | Lenor | |
| 2015/0331105 A1* | 11/2015 | Bell | G01S 17/89 356/4.01 |
| 2015/0347860 A1 | 12/2015 | Meier | |
| 2015/0357000 A1 | 12/2015 | Howell | |
| 2015/0363655 A1* | 12/2015 | Artan | G06K 9/00228 382/103 |
| 2016/0026855 A1 | 1/2016 | Mazumdar | |
| 2016/0063235 A1 | 3/2016 | Tussy | |
| 2016/0171312 A1 | 6/2016 | Aoki | |
| 2016/0171808 A1 | 6/2016 | Caterino | |
| 2016/0178936 A1 | 6/2016 | Yang | |
| 2016/0217319 A1* | 7/2016 | Bhanu | G06K 9/00281 |
| 2016/0239714 A1* | 8/2016 | Oami | G06K 9/00832 |
| 2016/0253331 A1 | 9/2016 | Roshen | |
| 2016/0300410 A1 | 10/2016 | Jones | |
| 2016/0343251 A1 | 11/2016 | Lee | |
| 2016/0379043 A1* | 12/2016 | Fazl Ersi | G06K 9/00268 382/118 |
| 2017/0046808 A1 | 2/2017 | Parrish | |
| 2017/0068863 A1* | 3/2017 | Rattner | G06K 9/00838 |
| 2017/0076140 A1 | 3/2017 | Waniguchi | |
| 2017/0106892 A1 | 4/2017 | Lisseman | |
| 2018/0018351 A1 | 1/2018 | Fagans | |
| 2018/0082131 A1 | 3/2018 | Li | |
| 2018/0089528 A1 | 3/2018 | Chan | |
| 2018/0157922 A1* | 6/2018 | Miyamoto | G06K 9/00255 |
| 2018/0181737 A1 | 6/2018 | Tussy | |
| 2018/0189551 A1 | 7/2018 | Ranganath | |
| 2018/0196587 A1 | 7/2018 | Bialynicka-Birula | |
| 2018/0225307 A1* | 8/2018 | Kocher | G06K 9/00993 |
| 2018/0306598 A1 | 10/2018 | Decia | |
| 2018/0307915 A1 | 10/2018 | Olson | |
| 2019/0089934 A1 | 3/2019 | Goulden | |
| 2019/0354750 A1 | 11/2019 | Nazemi | |
| 2019/0373157 A1* | 12/2019 | Kunihiro | G06K 9/00845 |
| 2022/0094880 A1 | 3/2022 | Hansen | |

FOREIGN PATENT DOCUMENTS

| | | | |
|---|---|---|---|
| CN | 104024827 | | 9/2014 |
| CN | 105785472 | | 7/2016 |
| DE | 10101341 | | 7/2002 |
| DE | 102015002802 | | 8/2015 |
| DE | 102014214352 | | 1/2016 |
| EP | 1482329 | A1 | 12/2004 |
| EP | 2620896 | A2 | 7/2013 |
| EP | 2993619 | A1 | 3/2016 |
| ES | 2395105 | A1 | 2/2013 |
| GB | 2258321 | A | 2/1993 |
| JP | 2003348573 | | 12/2003 |
| JP | 4366008 | | 11/2009 |
| JP | 05997871 | | 9/2016 |
| KR | 1020050003664 | | 1/2005 |
| KR | 20090031136 | A | 3/2009 |
| KR | 100964025 | B1 | 6/2010 |
| KR | 100964886 | B1 | 6/2010 |
| KR | 101252671 | | 4/2013 |
| KR | 101514444 | | 4/2015 |
| KR | 20150137666 | A | 12/2015 |
| KR | 101628390 | | 6/2016 |
| KR | 20190030960 | A | 3/2019 |
| WO | 200146668 | | 6/2001 |
| WO | 2004110054 | A1 | 12/2004 |
| WO | 2012160251 | | 11/2012 |
| WO | WO-2013004864 | A1 * | 1/2013 ............ G06Q 50/30 |
| WO | 2014054328 | | 4/2014 |
| WO | 2014110629 | A1 | 7/2014 |
| WO | 2015120413 | A1 | 8/2015 |
| WO | 2016183408 | | 11/2016 |
| WO | 2017151859 | A1 | 9/2017 |

OTHER PUBLICATIONS

Shishir Bashyal and Ganesh K. Venayagamoorthy, "Recognition of facial expressions using Gabor wavelets and learning vector quantization", Missouri University of Science and Technology, MO 65409, USA, Received Feb. 2, 2005; received in revised form Apr. 26, 2007; accepted Nov. 12, 2007.*

Jin Wei, Zhang Jian-qi, Zhang Xiang, "Face recognition method based on support vector machine and particle swarm optimization", © 2010 Elsevier Ltd. All rights reserved. doi: 10.1016/j.eswa.2010.09.108.*

Pavlidis et al., "Automatic Passenger Counting in the High Occupany Vehicle (HOV) Lanes," 19 pages, prior to Oct. 20, 2005.*

P. Jonathon Phillips,"Support Vector Machines Applied to Face Recognition", this is technical report NISTIR 6241, to appear in Advances in Neural Information, Processing Systems 11, eds. M. J. Kearns, S. A. Solla, and D. A. Cohn, MIT Press, 1999.*

Huaqing Li, Shaoyu Wang, and Feihu Qi, R. Klette and J. Zuni'c (Eds.),"Automatic Face Recognition by Support Vector Machines": IWCIA 2004, LNCS 3322, pp. 716-725, 2004. © Springer-Verlag Berlin Heidelberg 2004.*

Jia Hao, Yusuke Morishita, Toshinori Hosoi, Kazuyuki Sakurai, Hitoshi Imaoka, Takao Imaizumi, and Hideki Irisawa, "Large-scale Face Recognition on Smart Devices", 2013 Second IAPR Asian Conference on Pattern Recognition, 978-1-4799-2190-4/13, © 2013 IEEE, DOI 10.1109/ACPR.2013.189.*

PCT International Search Report and Written Opinion dated Feb. 21, 2019, issued during the prosecution of PCT International Patent Application No. PCT/US2018/64444 (15 pages).

Extended European Search Report for European Patent Application No. EP18885197.6, dated Jul. 9, 2021.

Viisage Technology, Inc. "FaceFINDER 2.5", Data Sheet, pp. 2 page; https://www.epic.org/privacy/surveillance/cptolight/1105/facefinder.pdf, 2004.

Dickson, Peter et al. "Mosaic Generation for Under Vehicle Inspection", Applications of Computer Vision, 2002. (WACV 2002), Pascataway, NJ, Dec. 3, 2022, pp. 251-256.

International Search Report and Written Opinion for PCT/US06/06708, dated Aug. 29, 2006.

(56) References Cited

OTHER PUBLICATIONS

International Search Report and Written Opinion for PCT/US2019/031755, dated Sep. 5, 2019.
International Search Report and Written Opinion for PCT/US2018/064444, dated Feb. 21, 2019.
International Search Report and Written Opinion for PCT/US2020/056429, dated Feb. 9, 2021.
International Search Report and Written Opinion for PCT/US2020/041195, dated Oct. 21, 2020.
International Search Report and Written Opinion for PCT/US2022/013783, dated May 16, 2022.

* cited by examiner

DETECTION, COUNTING AND IDENTIFICATION OF OCCUPANTS IN VEHICLES

CROSS-REFERENCE TO RELATED APPLICATIONS

This application claims the benefit of priority to U.S. Provisional Patent Application No. 62/596,497 filed Dec. 8, 2017, which is incorporated by reference herein in its entirety.

BACKGROUND OF THE INVENTION

1. Field of the Invention

The present disclosure relates to facial detection and recognition, and more particularly to facial detection and recognition for occupants in vehicles.

2. Description of Related Art

At security check points, border crossings, high occupancy vehicle (HOV) lanes, and the like it, is desirable to know how many occupants are in each vehicle that passes. At a traditional checkpoint an officer can count occupants that are visible in a vehicle. In security applications, it can be desirable to know who the occupants of a vehicle are. An officer can verify this by inspection of identification documents such as a photo ID for each occupant of the vehicle. However, these techniques require each vehicle to stop for inspection before passing through.

The conventional techniques have been considered satisfactory for their intended purpose. However, there is an ever present need for improved systems and methods for detecting, counting, and identifying occupants in vehicles. This disclosure provides a solution for this need.

SUMMARY OF THE INVENTION

A system for detecting occupants in a vehicle includes a controller and a plurality of camera systems external to the vehicle in a vehicle approach area, wherein each camera system is operatively connected to the controller. A trigger in the vehicle approach area is operatively connected to the controller to detect an approaching vehicle and control the camera systems to acquire images of the approaching vehicle. The controller includes machine readable instructions configured to cause the controller to perform any method as disclosed herein.

Each camera system can include an imaging sensor, a pulsed illumination device, and a processor operatively connecting the imaging sensor to the pulsed illumination source for synchronizing illumination a pulse from the pulsed illumination device with exposure of the imaging sensor. Each camera system can include a lens optically coupled to the imaging sensor, an optical bandpass filter operatively connected to filter light passing through the lens, and a linear polarization filter operatively connected to filter light passing through the lens.

A method of detecting occupants in a vehicle includes detecting an oncoming vehicle and acquiring a plurality of images of occupants in the vehicle in response to detection of the vehicle. The method includes performing automated facial detection on the plurality of images and adding a facial image for each face detected to a gallery of facial images for the occupants of the vehicle. The method includes performing automated facial recognition on the gallery of facial images to group the facial images into groups based on which occupant is in the respective facial images, and counting the groups to determine how many occupants are in the vehicle.

The method can include selecting a representative image from each group, and outputting a set of cropped selected images, one uniquely cropped selected image for each of the occupants. It is contemplated that no duplicate images of a given occupant need be stored or displayed. Selecting the representative image from each group can include selecting images based on corresponding confidence scores from the automated facial detection. Selecting the representative image from each group can include selecting images based on which image in the group has least facial offset angle from line of sight of an imaging sensor which acquired the respective image. The method can include running the selective images through a database to check for matches between the occupants and known individuals in the database. The method can include initiating a response upon finding a match in the database, wherein the response include at least one of outputting an alert on a visual display, sounding an audible alarm, closing a physical barrier, transmitting a citation, mailing a citation, and/or dispatching an officer. It is also contemplated that the method can include initiating a response upon determining an improper number of occupants in the vehicle, wherein the response includes at least one of outputting an alert on a visual display, sounding an audible alarm, closing a physical barrier, transmitting a citation, mailing a citation, and/or dispatching an officer.

Each image can be acquired from a different sensor viewing the vehicle from a different respective angle. The method can include illuminating the vehicle with a respective pulse of illumination for each image acquired, wherein each pulse of illumination is performed at a different time to reduce shadows cast onto the occupants while acquiring the plurality of images.

One of the sensors can be a primary sensor that acquires a primary image of occupants in the vehicle, wherein faces detected in primary image serve as references in the gallery for facial recognition for subsequent ones of the images of occupants in the vehicle. The method can include adding a new face to the gallery each time a detected face in a subsequent one of the images of occupants in the vehicle does not match with a face already in the gallery. The method can include iteratively comparing faces detected in subsequent ones of the images of occupants in the vehicle and adding each face detected to the gallery that is not already in the gallery until there is an image in the gallery of each face detected by performing automated facial detection.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
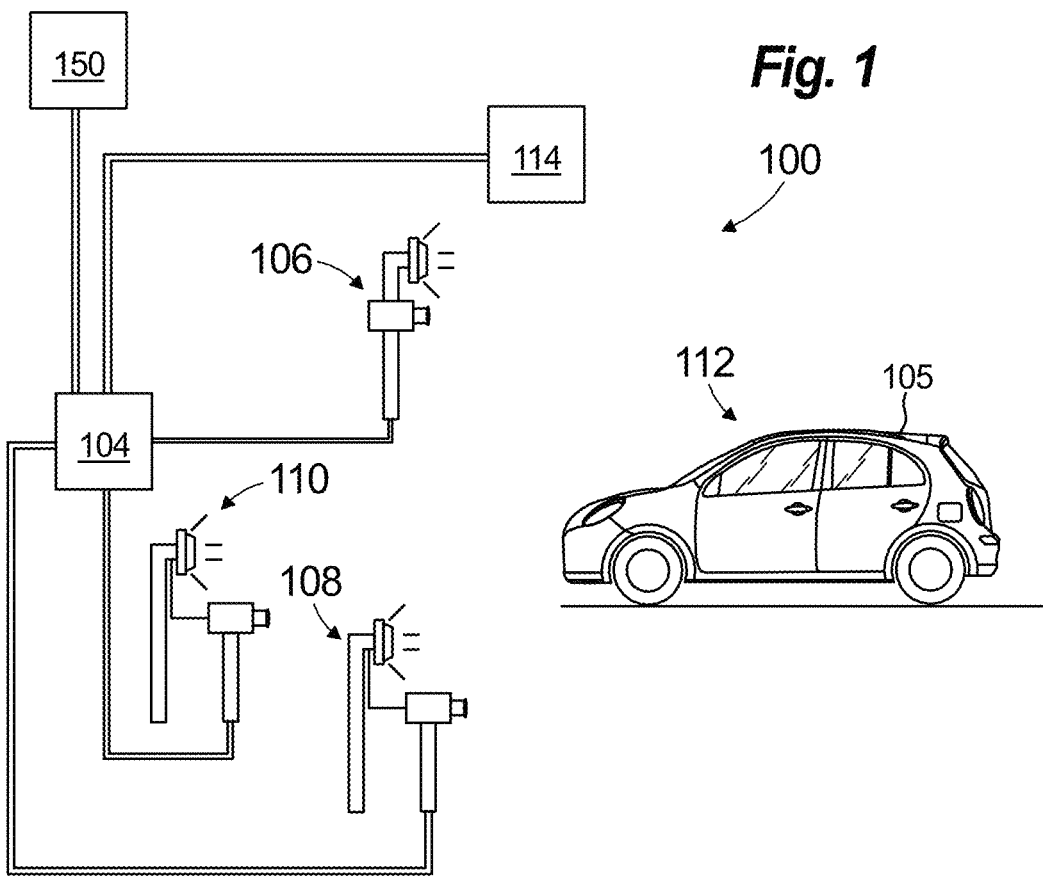
FIG. 1 is a schematic side elevation view of an exemplary embodiment of a system constructed in accordance with the present disclosure, showing multiple camera systems with an approaching vehicle.

Reference will now be made to the drawings wherein like reference numerals identify similar structural features or aspects of the subject disclosure. For purposes of explanation and illustration, and not limitation, a partial view of an exemplary embodiment of a system in accordance with the disclosure is shown in FIG. 1 and is designated generally by reference character 100. Other embodiments of systems in accordance with the disclosure, or aspects thereof, are provided in FIGS. 2-4, as will be described. The systems and methods described herein can be used for automated counting and identification of occupants in vehicles.

Figure 2:
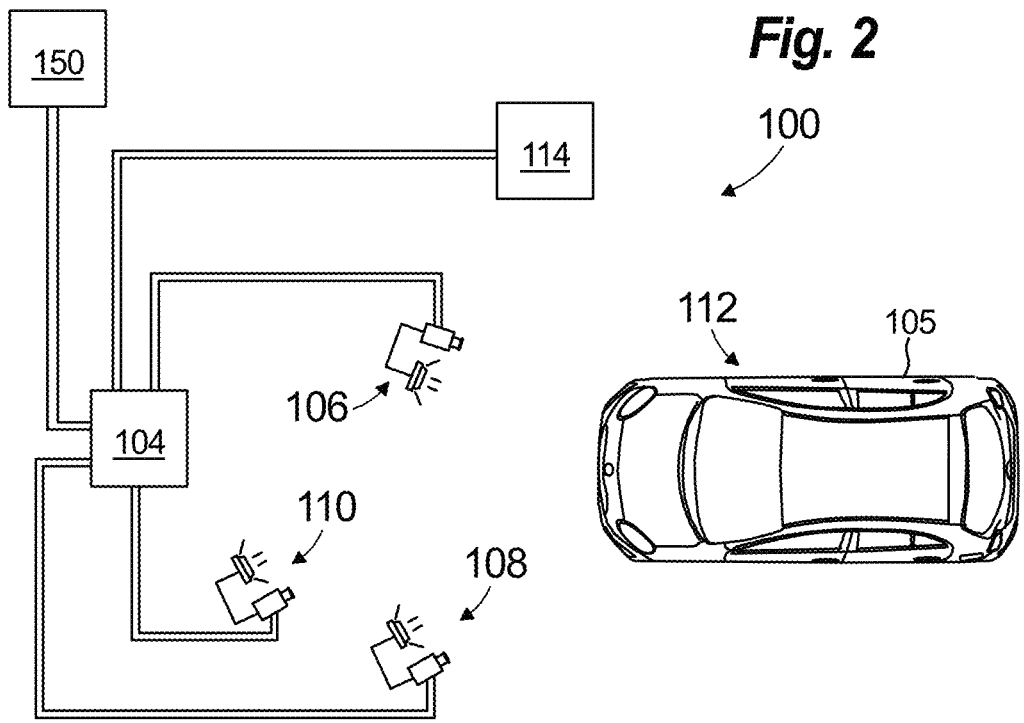
FIG. 2 is a schematic plan view of the system of FIG. 1, showing the positions of the camera systems.

The system 100 for detecting occupants in a vehicle 102 includes a controller 104 and a plurality of camera systems 106, 108, and 110 that are external to the vehicle 105 in the vehicle approach area 112. Each camera system 106, 108, and 110 is operatively connected to the controller 104. A trigger 114 in the vehicle approach area 112 is operatively connected to the controller 104 to detect an approaching vehicle 105 and to control the camera systems 106, 108, and 110 to acquire images of the approaching vehicle 105. The controller 104 includes machine readable instructions configured to cause the controller 104 to perform any method as disclosed herein. As shown in FIGS. 1 and 2, each camera system 106, 108, and 110 is in a different location for acquiring images with sensors viewing the vehicle from different respective angles.

Figure 3:
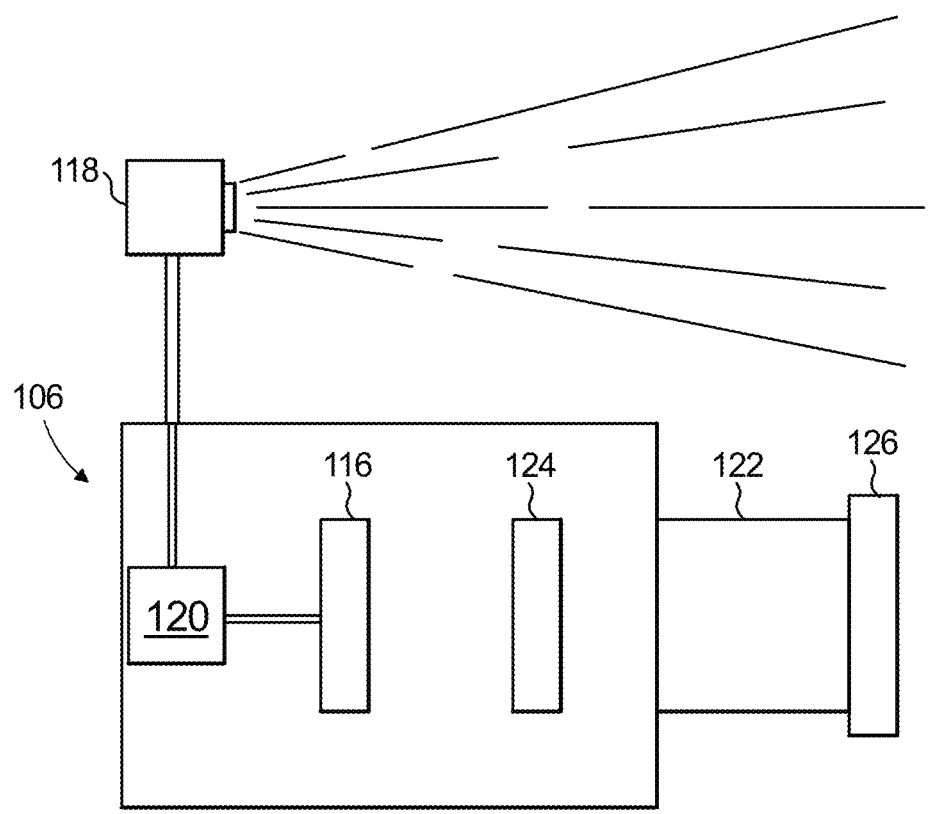
FIG. 3 is a schematic view of one of the camera systems of FIGS. 1 and 2, showing the imaging sensor.

With reference now to FIG. 3, camera system 106 includes an imaging sensor 116, a pulsed illumination device 118, and a processor 120 operatively connecting the imaging sensor 116 to the pulsed illumination source 118 for synchronizing an illumination pulse from the pulsed illumination device 118 with exposure of the imaging sensor 116. The illumination device 118 can be located on camera as in camera system 106 shown in FIG. 3, or can be located off-camera as in camera systems 108 and 110 shown in FIGS. 1-2. The camera system 106 include a lens 122 optically coupled to the imaging sensor 116, an optical bandpass filter 124 operatively connected to filter light passing through the lens 122 to the imaging sensor 116. The camera system 106 also includes a linear polarization filter 126 operatively connected to filter light passing through the lens 122 to the sensor 116, e.g., to reduce glare from glass windshields and windows of the vehicle 105. Imaging sensors 108 and 110 can include the same components as camera system 106.

Figure 4:
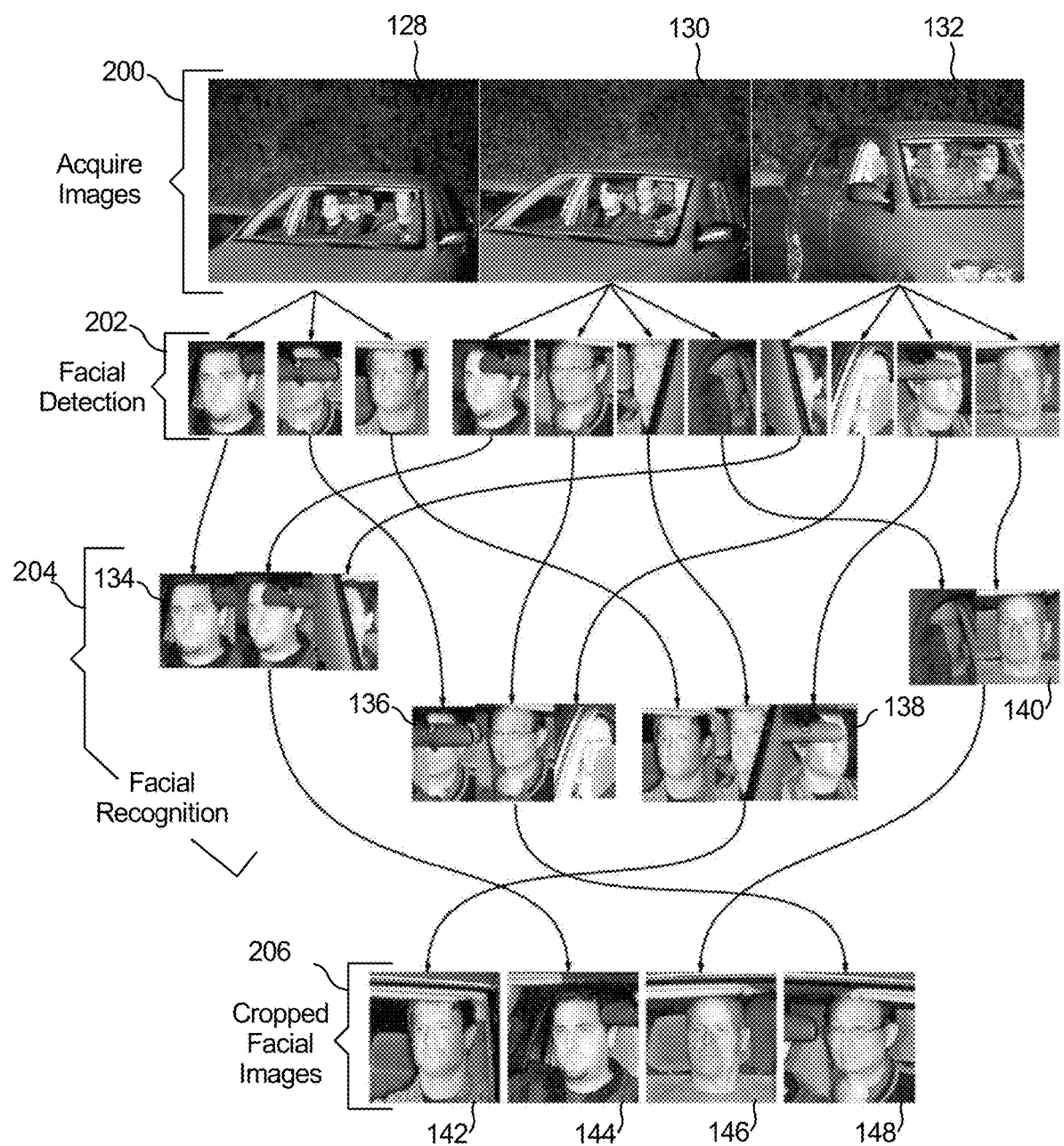
FIG. 4 is a schematic view of a method in accordance with the subject disclosure, showing a process using images acquired by the system of FIG. 1.

With reference now to FIG. 4, a method of detecting occupants in a vehicle includes detecting an oncoming vehicle, e.g., detecting oncoming vehicle 105 using trigger 114 as shown in FIG. 1. When trigger 114 detects an oncoming vehicle 105, it signals the controller 104. Controller 104 then commands the camera systems 106, 108, and 110 to acquire a plurality of images of occupants in the vehicle 105. Each camera system 106, 108, and 110 can acquire a respective image 128, 130, and 132, forming a set 200 of acquired images as shown in FIG. 4. Controller 104 can illuminate the vehicle 105 with a respective pulse of illumination from each respective illumination device 118 for each image acquired, wherein each pulse of illumination is performed at a different time to reduce shadows cast onto the occupants while acquiring the plurality of images.

The method includes having controller 104 perform automated facial detection on the plurality of images 128, 130, and 132, and to add a facial image for each face detected to a gallery 202 of facial images for the occupants of the vehicle 105. For the image 128, three faces are detected and four faces are detected from each of images 130 and 132. Controller 104 performs automated facial recognition on the facial images of gallery 202 to group the facial images into groups 134, 136, 138, and 140 based on which occupant is in the respective facial images, as indicated by facial recognition groupings 204 in FIG. 4. While multiple images are shown in FIG. 4 in each of the groups 134, 136, 138, and 140, it should be understood that the groups 134, 136, 138, and 140 need not ever actually contain multiple images in each group. For example during facial recognition, each time a new image of a given individual is identified, controller 104 can decide whether the new image is better than the previous best image of the individual (based on facial detection confidence scores, facial offset angle, or the like, as described below), and if so the new image replaces the previous image in the respective group. In this way each group 134, 136, 138, and 140 only ever includes one image.

Facial detection and facial recognition need not necessarily be performed one after another, but instead can be performed together on the fly. One of the sensors 120 can be a primary sensor, e.g., the sensor 120 of camera system 106, that acquires a primary image, e.g., image 128, of occupants in the vehicle 105. The faces detected in primary image 128 can serve as references in the gallery 202 for facial recognition for subsequent ones of the images 130 and 132 of occupants in the vehicle. The controller 104 can add a new face to the gallery 202 each time a detected face in a subsequent one of the images 130 and 132 does not match with a face already in the gallery 202. The controller 104 can iteratively compare faces detected in subsequent ones of the images 128, 130, and 132 and add each face detected to the gallery 202 that is not already in the gallery 202 until there is an image in the gallery 202 of each face detected by performing automated facial detection.

Whenever a face is detected for which there is already an image in the gallery 202, the best image of the face can be retained in the image gallery 202. Controller 104 selects a representative image 142, 144, 146, and 148 from each group 134, 136, 138, and 145 and can output a set 206 of cropped selected images, one uniquely cropped selected image for each of the occupants. Set 206 includes no duplicate images, i.e. no more than one image is in set 206 for a given occupant, so duplicate images of a given occupant need be stored or displayed. The controller 104 can select the representative image 142, 144, 146, and 148 from each group 134, 136, 138, and 140 by selecting images based on corresponding confidence scores from the automated facial detection. It is also contemplated that controller 104 can selecting the representative image 142, 144, 146, and 148 from each group 134, 136, 138, and 140 by selecting images based on which image in the group has least facial offset angle from line of sight of the imaging sensor 120 which acquired the respective image. This selection process can be run on the fly with facial detection and facial recognition to winnow the gallery 202 down to the set 206.

The controller 104 can determine how many occupants are in the vehicle 105 by counting the groups 134, 136, 138, and 140. In this example, there are four groups 134, 136, 138, and 140 indicating there are four occupants in the vehicle 105. If groups 134, 136, 138, and 140 are conflated down to the set 206 on the fly as described above, then the groups 134, 136, 138, and 140 can be counted indirectly by simply counting the final cropped images in set 206 to determine how many occupants are in the vehicle 105.

The controller 104 can output the number of occupants in the vehicle 105, and can provide other output actions as needed. For example, controller 104 can initiate a response, e.g., via the output device 150, upon determining an improper number of occupants in the vehicle. For example, if controller 104 determines there are not enough occupants in a vehicle in an HOV lane, controller 150 can use the output device 150 to output an alert on a visual display, sound an audible alarm, close a physical barrier, transmit a citation, mail a citation, update a database, and/or dispatch an officer.

It is also contemplated that with the set of images 206, controller 104 can run the final cropped facial images through a facial recognition database, either locally or remotely, to check for matches between the occupants and known individuals in the database. If a match is found, e.g., one of the occupants in the vehicle 105 is on a watch list, the controller 104 can initiate an output response, e.g., using output device 150, such as outputting an alert on a visual display, sounding an audible alarm, closing a physical barrier, transmitting a citation, mailing a citation, updating a database, and/or dispatching an officer.

While shown and described herein in an exemplary context where there are n=3 camera systems and m=4 occupants in the vehicle 105, those skilled in the art will readily appreciate that any suitable number n of camera systems can be used, and any suitable number m of occupants in a vehicle can be counted/identified without departing from the scope of this disclosure.

The methods and systems of the present disclosure, as described above and shown in the drawings, provide for counting and identifying occupants in vehicles with superior properties including reliable, automated detection and identification of all occupants in a moving vehicle. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of detecting occupants in a vehicle using a system comprising a first camera positioned on a driver's side of the vehicle and a second camera positioned on a passenger's side of the vehicle, the method comprising:
   detecting an oncoming vehicle;
   using the first camera and the second camera, acquiring a plurality of images of occupants in the vehicle in response to detection of the vehicle, wherein the first camera acquires a first portion of the plurality of images from a first angle, wherein the second camera acquires a second portion of the plurality of images from a second angle, and wherein the first angle is different from the second angle;
   performing automated facial detection on the plurality of images;
   based on the automated facial detection, generating a gallery of facial images from the plurality of images, wherein the gallery of facial images comprises a first facial image of at least one of the occupants taken from the first angle and a second facial image of said at least one of the occupants taken from the second angle, thereby resulting in said gallery of facial images comprising multiple images of said at least one of the occupants;
   performing, after forming the gallery of facial images, automated facial recognition on the gallery of facial images to form facial groupings, wherein each of the facial groupings comprise facial images of only one of the occupants and wherein at least one of said facial groupings comprises said multiple images of the at least one of the occupants and no facial images of other ones of said occupants;
   generating a confidence score for each of the images in each of the facial groupings based on the automated facial detection performed on each of the facial groupings;
   selecting a representative image from each of the facial groupings based on the corresponding confidence score;
   outputting the representative image from each of the facial groupings to create a set of unique images, each of which is representative of only one of the occupants; and
   counting the groups to determine how many occupants are in the vehicle.

2. The method as recited in claim 1, wherein no multiple images of a given occupant are stored or displayed.

3. The method as recited in claim 1, wherein selecting the representative image from each of the facial groupings comprises:
   for each image in each of the facial groupings, determining a facial offset angle from a line of sight of an imaging sensor that acquired the image; and
   selecting the representative image based on which image in the facial grouping has a smallest facial offset angle.

4. The method as recited in claim 1, further comprising:
   comparing each of the unique images to images of known individuals in a database and determining if any of the unique images match at least one of said images of known individuals.

5. The method as recited in claim 4, further comprising initiating a response upon finding a match in the database, wherein the response includes at least one of outputting an alert on a visual display, sounding an audible alarm, closing a physical barrier, transmitting a citation, mailing a citation, or dispatching an officer.

6. The method as recited in claim 1, further comprising initiating a response upon determining an improper number of occupants in the vehicle, wherein the response includes at least one of outputting an alert on a visual display, sounding an audible alarm, closing a physical barrier, transmitting a citation, mailing a citation, or dispatching an officer.

7. The method as recited in claim 1, further comprising illuminating the vehicle with a respective pulse of illumination for each image acquired, wherein each pulse of illumination is performed at a different time to reduce shadows cast onto the occupants while acquiring the plurality of images.

8. The method as recited in claim 1, further comprising capturing a primary image of the occupants in the vehicle, applying facial detection to the primary image to generate reference images and using said reference images in the automated facial recognition to form the facial groupings.

9. The method as recited in claim 8, further comprising adding a new face to the gallery of facial images each time a detected face does not match with a face already in the gallery of facial images.

10. The method as recited in claim 8, further comprising adding each face detected to the gallery of facial images that is not already in the gallery until there is an image in the gallery of facial images of each face detected by said automated facial detection process.

11. A system for detecting occupants in a vehicle using a plurality of images, comprising:
a controller;
a first camera positioned on a driver's side of the vehicle and a second camera positioned on a passenger's side of the vehicle, wherein the first camera and the second camera are operatively coupled to the controller, and wherein each of the first camera and the second camera comprises an imaging sensor, a pulsed illumination device, and a processor operatively coupling the imaging sensor to the pulsed illumination source for synchronizing pulses of illumination with exposure of the imaging sensor; and
a trigger operatively connected to the controller to detect the vehicle and control the first camera and the second camera to acquire images of the vehicle, wherein the first camera acquires a first portion of the plurality of images from a first angle, wherein the second camera acquires a second portion of the plurality of images from a second angle, and wherein the first angle is different from the second angle; and
machine readable instructions stored in a non-transient storage medium and configured to be executed by the controller, wherein executing the machine readable instructions causes the controller to:
detect an oncoming vehicle based upon the trigger;
acquire the first portion of the plurality of images and the second portion of the plurality of images;
perform automated facial detection on the plurality of images;
based on the automated facial detection, generate a gallery of facial images from the plurality images, wherein the gallery of facial images comprises a first facial image of at least one of the occupants taken from the first angle and a second facial image of said at least one of the occupants taken from the second angle, thereby resulting in said gallery of facial images comprising multiple images of said at least one of the occupants;
perform, after formation of the gallery of facial images, automated facial recognition on the gallery of facial images to form facial groupings, wherein each of the facial groupings comprise facial images of only one of the occupants and wherein at least one of said facial groupings comprises said multiple images of the at least one of the occupants and no facial images of other ones of said occupants;
generate a confidence score for each of the images in the facial groupings based on the automated facial detection performed on each of the facial groupings;
select a representative image from each of the facial groupings based on the corresponding confidence scores;
output the representative image from each of the facial groupings to create a set of unique images, each of which is representative of only one of the occupants; and count the groups to determine how many occupants are in the vehicle.

12. The system as recited in claim 11, wherein the machine readable instructions comprise instructions that, when executed, cause the controller to illuminate the vehicle with a pulse of illumination from the pulsed illumination device for each of the plurality of images, wherein each pulse of illumination is performed at a different time to reduce shadows cast onto the occupants while acquiring the plurality of images.

13. The system as recited in claim 11, wherein each of the first camera and the second camera comprises a lens optically coupled to the imaging sensor, and at least one of an optical bandpass filter operatively configured to filter light passing through the lens or a linear polarization filter operatively configured to filter light passing through the lens.

14. The system as recited in claim 1, wherein the machine readable instructions comprise instructions that, when executed, cause the controller to determine a facial offset angle from a line of sight of an imaging sensor that acquired the image for each image in each of the facial groupings and select the representative image based on which image in the facial grouping has a smallest facial offset angle.

15. A method of detecting occupants in a vehicle using a system comprising a first camera positioned on a driver's side of the vehicle and a second camera positioned on a passenger's side of the vehicle, The method comprising:
detecting an oncoming vehicle;
using the first camera and the second camera, acquiring a plurality of images of occupants in the vehicle in response to detection of the vehicle, wherein the first camera acquires a first portion of the plurality of images from a first angle, wherein the second camera acquires a second portion of the plurality of images from a second angle, and wherein the first angle is different from the second angle;
performing automated facial detection on the plurality of images;
based on the automated facial detection, generating a gallery of facial images from the plurality of images, wherein the gallery of facial images comprises a first facial image of at least one of the occupants taken from the first angle and a second facial image of said at least one of the occupants taken from the second angle, thereby resulting in said gallery of facial images comprising multiple images of said at least one of the occupants;
performing, after forming the gallery of facial images, automated facial recognition on the gallery of facial images to form facial groupings, wherein each of the facial groupings comprise facial images of only one of the occupants and wherein at least one of said facial groupings comprises said multiple images of the at least one of the occupants and no facial images of other ones of said occupants;
determining a facial offset angle from a line of sight of an imaging sensor that acquired the image for each image in each of the facial groupings;
selecting a representative image from each of the facial groupings based on which image in the facial grouping has a smallest offset angle;
outputting the representative image from each of the facial groupings to create a set of unique images, each of which is representative of only one of the occupants; and
counting the groupings to determine how many occupants are in the vehicle.

16. The method as recited in claim 15, wherein no multiple images of a given occupant are stored or displayed.

17. The method as recited in claim 15, further comprising: comparing each of the unique images to images of known individuals in a database and determining if any of the unique images match at least one of said images of known individuals.

18. The method as recited in claim 15, further comprising initiating a response upon finding a match in the database, wherein the response includes at least one of outputting an alert on a visual display, sounding an audible alarm, closing a physical barrier, transmitting a citation, mailing a citation, or dispatching an officer.

19. The method as recited in claim 15, further comprising initiating a response upon determining an improper number of occupants in the vehicle, wherein the response includes at least one of outputting an alert on a visual display, sounding an audible alarm, closing a physical barrier, transmitting a citation, mailing a citation, or dispatching an officer.

20. The method as recited in claim 15, further comprising illuminating the vehicle with a respective pulse of illumination for each image acquired, wherein each pulse of illumination is performed at a different time to reduce shadows cast onto the occupants while acquiring the plurality of images.

21. The method as recited in claim 15, further comprising capturing a primary image of the occupants in the vehicle, applying facial detection to the primary image to generate reference images and using said reference images in the automated facial recognition to form the facial groupings.

22. The method as recited in claim 21, further comprising adding a new face to the gallery of facial images each time a detected face does not match with a face already in the gallery of facial images.

23. The method as recited in claim 21, further comprising adding each face detected to the gallery of facial images that is not already in the gallery until there is an image in the gallery of facial images of each face detected by said automated facial detection process.

24. A system for detecting occupants in a vehicle using a plurality of images, comprising:
- a controller;
- a first camera positioned on a driver's side of the vehicle and a second camera positioned on a passenger's side of the vehicle, wherein the first camera and second camera are operatively coupled to the controller and wherein each of the first camera and the second camera comprises an imaging sensor, a pulsed illumination device, and a processor operatively coupling the imaging sensor to the pulsed illumination source for synchronizing pulses of illumination with exposure of the imaging sensor; and
- a trigger operatively connected to the controller to detect the vehicle and control the first camera and the second camera to acquire images of the vehicle, wherein the first camera acquires a first portion of the plurality of images from a first angle, wherein the second camera acquires a second portion of the plurality of images from a second angle, and wherein the first angle is different from the second angle; and
- machine readable instructions stored in a non-transient storage medium and configured to be executed by the controller, wherein executing the machine readable instructions causes the controller to:
- detect an oncoming vehicle based upon the trigger;
- acquire the first portion of the plurality of images and the second portion of the plurality of images;
- perform automated facial detection on the plurality of images;
- based on the automated facial detection, generate a gallery of facial images from the plurality images, wherein the gallery of facial images comprises a first facial image of at least one of the occupants taken from the first angle and a second facial image of said at least one of the occupants taken from the second angle, thereby resulting in said gallery of facial images comprising multiple images of said at least one of the occupants;
- perform, after formation of the gallery of facial images, automated facial recognition on the gallery of facial images to form facial groupings, wherein each of the facial groupings comprise facial images of only one of the occupants and wherein at least one of said facial groupings comprises said multiple images of the at least one of the occupants and no facial images of other ones of said occupants;
- determine a facial offset angle from a line of sight of an imaging sensor that acquired the image for each image in each of the facial groupings;
- select a representative image from each of the facial groupings based on which image in the facial grouping has a smallest facial offset angle;
- output the representative image from each of the facial groupings to create a set of unique images, each of which is representative of only one of the occupants; and
- count the groupings to determine how many occupants are in the vehicle.

25. The system as recited in claim 24, wherein the machine readable instructions comprise instructions that, when executed, cause the controller to illuminate the vehicle with a pulse of illumination from the pulsed illumination device for each of the plurality of images, wherein each pulse of illumination is performed at a different time to reduce shadows cast onto the occupants while acquiring the plurality of images.

26. The system as recited in claim 25, wherein each of the first camera and the second camera comprises a lens optically coupled to the imaging sensor, and at least one of an optical bandpass filter operatively configured to filter light passing through the lens or a linear polarization filter operatively configured to filter light passing through the lens.

* * * * *